(12) United States Patent
Debling

(10) Patent No.: US 7,031,903 B2
(45) Date of Patent: *Apr. 18, 2006

(54) INTERFACE DEVICE

(75) Inventor: Anthony Debling, Westbury on Trym (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 589 days.

This patent is subject to a terminal disclaimer.

(21) Appl. No.: 09/981,664

(22) Filed: Oct. 16, 2001

(65) Prior Publication Data

US 2002/0046399 A1 Apr. 18, 2002

(30) Foreign Application Priority Data

Oct. 18, 2000 (GB) .................................... 0025592

(51) Int. Cl.
*G06F 9/455* (2006.01)
(52) U.S. Cl. .................... 703/27; 703/23; 703/24; 703/25; 703/28; 710/72; 710/305; 714/28
(58) Field of Classification Search ............ 703/23, 703/24, 25, 27, 28; 710/72, 305; 714/28
See application file for complete search history.

(56) References Cited

U.S. PATENT DOCUMENTS

| | | | |
|---|---|---|---|
| 4,860,290 A | 8/1989 | Daniels et al. | |
| 5,173,904 A | 12/1992 | Daniels et al. | |
| 5,329,471 A | 7/1994 | Swoboda et al. | |
| 5,535,331 A | 7/1996 | Swoboda et al. | |
| 5,684,721 A | 11/1997 | Swoboda et al. | |
| 6,032,268 A | 2/2000 | Swoboda et al. | |
| 6,085,336 A | 7/2000 | Swoboda et al. | |
| 6,370,603 B1 * | 4/2002 | Silverman et al. | ............ 710/72 |
| 6,816,750 B1 * | 11/2004 | Klaas | ......................... 700/121 |
| 2002/0059541 A1 * | 5/2002 | Swoboda | ..................... 714/28 |

FOREIGN PATENT DOCUMENTS

| | | |
|---|---|---|
| WO | WO 98 09208 A | 3/1998 |
| WO | WO 00 57587 A | 9/2000 |

OTHER PUBLICATIONS

Lehrbaum, "Embedded Systems News SOC it To 'Ya!'", Linux Journal, Aug. 2000, 2 pages.*

(Continued)

*Primary Examiner*—Kamini Shah
*Assistant Examiner*—Herng-der Day
(74) *Attorney, Agent, or Firm*—Lisa K. Jorgenson; James H. Morris; Wolf, Greenfield & Sacks, P.C.

(57) ABSTRACT

A communication device for a target integrated circuit chip having a digital processor, an on-chip emulator for controlling the digital processor and for collecting operation data from the digital processor for communicating to off-chip circuitry, and a target on-chip universal serial bus interface connected to the on-chip emulator, the communication device including an Ethernet port, an universal serial bus port and a further integrated circuit chip having on-chip universal serial bus interface, the on-chip Ethernet interface being connected to the Ethernet port, the interfaces being connected to the processing circuitry for translating between Ethernet protocol data on an Ethernet bus connected to the Ethernet port and universal serial bus data for the target on-chip universal serial bus interface.

11 Claims, 2 Drawing Sheets

OTHER PUBLICATIONS

Kozu, "A 9-M Tr. Access Network System-On-a-Chip For Mega-bit Internet access at Home", Proceedings of the IEEE 2000 Custom Integrated Circuits Conference, May 2000, pp. 231-234.*

Standard Search Report from British application No. 0025591, filed Oct. 18, 2001.

Standard Search Report from RS 105935.

*USB Express Net: USB to Ethernet User's Guide*, Jaton corporation Technical Manuals, Jul. 1999, XP002161404.

*Power Debug Module Reaches New Download Speeds*, Lauterback press releases, May 31, 2000, XP002161405.

PODBUS Ethernet Controller Lauterback Technical Manuals, XP002161406.

* cited by examiner

INTERFACE DEVICE

FIELD OF THE INVENTION

The present invention relates to a communication device suitable for debugging a digital processor on a single integrated circuit chip, the chip comprising an on-chip emulation device.

BACKGROUND TO THE INVENTION

Known techniques for debugging embedded digital processors include the use of on-chip emulation devices whose function is to monitor and control the operation of the digital processor. Such on-chip emulation devices typically have storage capability, and the ability to initiate command and control sequences for the digital processor in response to externally applied signals from a host computer or to detected states of the digital processor.

Communication between the on-chip emulation device (oce) and the host computer is carried out via a link, which is typically a link designed for the particular situation. As a result, signals over the link may be tailored to the particular on-chip emulation device in the interests of efficient debugging.

There is however a problem in that the use of a specialized link dictates a physical link dedicated to the system, and also requires the host computer to be running programs dedicated to the production of signals for the on-chip emulation device of concern.

It is proposed in a copending patent application to provide such a chip with a universal serial bus (usb) port and interface for communication with the on-chip emulator.

It is however desirable to further enhance the communication possibilities to such a chip.

SUMMARY OF THE INVENTION

According to a first aspect of the invention there is provided a communication device for a target integrated circuit chip having a digital processor, an on-chip emulator for controlling said digital processor and for collecting operation data from said digital processor for communicating to off-chip circuitry, and a target on-chip universal serial bus interface connected to said on-chip emulator, the communication device comprising an Ethernet port, a universal serial bus port and a further integrated circuit chip having on-chip processing circuitry, on-chip memory circuitry, an on-chip Ethernet interface and an on-chip universal serial bus interface, said on-chip Ethernet interface being connected to said Ethernet port, the said interfaces being connected to said processing circuitry for translating between Ethernet protocol data on an Ethernet bus connected to said Ethernet port and universal serial bus data for said target on-chip universal serial bus interface.

Preferably the device further comprises an on-chip memory interface for connection to memory in said device but external to said chip.

Advantageously the device further comprises modem circuitry for connection of a telephone line to said universal serial bus.

In one embodiment the modem circuitry comprises a soft modem running on said on-chip processing circuitry.

In a second embodiment the said modem circuitry comprises a hard modem.

According to a second embodiment of the invention there is provided the combination of a communication device and a target integrated circuit chip, said target integrated circuit chip having a digital processor, an on-chip emulator for controlling said digital processor and for collecting operation data from said digital processor for communicating to off-chip circuitry, and a target on-chip universal serial bus interface connected to said on-chip emulator, the communication device comprising an Ethernet port for connection to said off-chip circuitry, a universal serial bus port and a further integrated circuit chip having on-chip processing circuitry, on-chip memory circuitry, an on-chip Ethernet interface and an on-chip universal serial bus interface, said on-chip Ethernet interface being connected to said Ethernet port, the said interfaces being connected to said processing circuitry for translating between Ethernet protocol data on an Ethernet bus connected to said Ethernet port and universal serial bus data for said target on-chip universal serial bus interface.

Preferably the combination further comprises modem circuitry for connection of a telephone line to said processing circuitry of said communication device.

According to a further aspect of the present invention there is provided a method of communicating with a target integrated circuit chip having a digital processor, an on-chip emulator for controlling said digital processor and for collecting operation data from said digital processor for communicating to off-chip circuitry, and a target on-chip universal serial bus interface connected to said on-chip emulator, the method comprising: supplying data from said off-chip circuitry via an Ethernet bus to an Ethernet port of a communication device comprising a further integrated circuit chip having on-chip Ethernet interface circuitry and on-chip processing circuitry; passing said data as an input said Ethernet interface circuitry; in said Ethernet interface circuitry, translating said data into a form suitable for said on-chip processing circuitry; supplying said translated data to said on-chip processing circuitry; processing said translated data to provide output data; applying said output data to an on-chip universal serial bus interface, for transfer via a universal serial bus to said on-chip emulator of said target integrated circuit chip.

According to yet another aspect of the invention there is provided a method of debugging a target integrated circuit chip using a host computer device, said target integrated circuit chip having a digital processor and an on-chip emulator wherein said on-chip emulator is operable to control said digital processor according to a host program and to collect operation data from said digital processor for communicating to said host, said chip comprising a target on-chip universal serial bus interface connected to said on-chip emulator, the method comprising: providing a communication device comprising an Ethernet port, a universal serial bus port and a further integrated circuit chip having on-chip processing circuitry, on-chip memory circuitry, an on-chip Ethernet interface and an on-chip universal serial bus interface, connecting said Ethernet port to said host via an Ethernet link; connecting said communication device to said target on-chip universal serial bus interface via a universal serial bus; communicating data between said on-chip emulator and said on-chip processing circuitry; processing data in said on-chip processing circuitry to provide output data; and supplying said output data to said host via said Ethernet port.

Preferably the method further comprises loading a program from said host to said on-chip processing circuitry over said Ethernet link.

According to a still further aspect of the invention there is provided a method of debugging a target integrated circuit chip having a digital processor and an on-chip emulator wherein said on-chip emulator is operable to control said digital processor and to collect operation data from said digital processor for communicating to a host, said chip comprising a target on-chip universal serial bus interface connected to said on-chip emulator, the method comprising, providing a communication device comprising an Ethernet port, a universal serial bus port and a further integrated circuit chip having on-chip processing circuitry, on-chip memory circuitry, an on-chip Ethernet interface and an on-chip universal serial bus interface, connecting said Ethernet port to said host; connecting said communication device to said target on-chip universal serial bus interface via a universal serial bus; communicating data between said on-chip emulator and said on-chip processing circuitry; processing said data in said on-chip processing circuitry to provide output data; supplying said output data to said on-chip emulator circuitry.

Preferably the method comprises running an embedded web-server process on said on-chip processing circuitry.

An embodiment of the invention will now be described, by way of example only, with reference to the accompanying drawings.

DESCRIPTION OF THE PREFERRED EMBODIMENT

Figure 1:
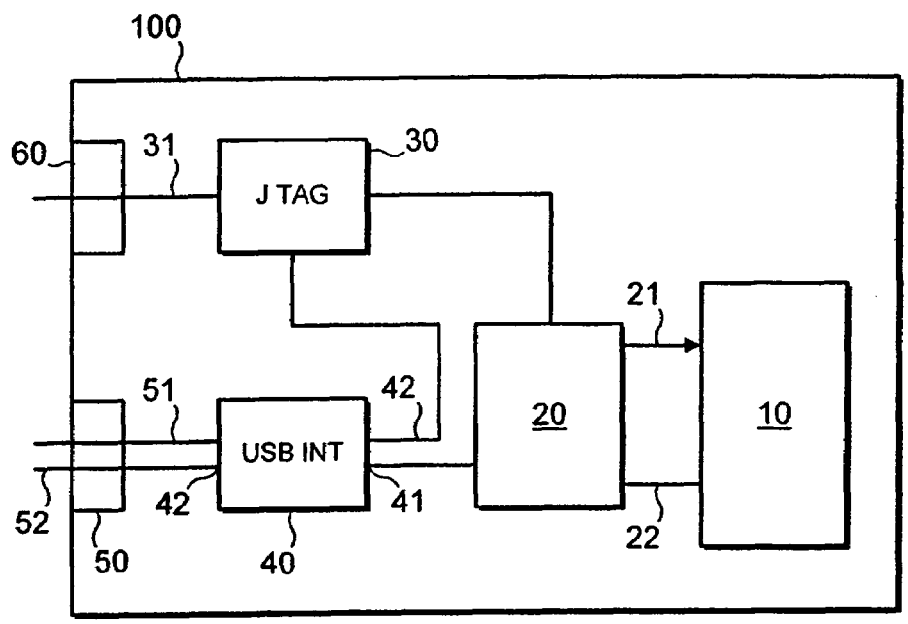
FIG. 1 shows a block schematic diagram of an integrated circuit chip incorporating an on-chip emulator, the chip having a single on-chip processor.

Referring first to FIG. 1, an embedded system includes an integrated circuit chip 100 which comprises a processor 10 on said chip. As used herein, the term 'processor' includes microprocessors and digital signal processors. The processor is connected to other component circuitry of said embedded system in a manner known to those skilled in the art.

At least during debugging of said embedded system, it is advantageous to be able to collect information about the operation of the processor and also to supply control and command information to said processor, both in response to conditions on the processor itself, and also in response to information conveyed from a host computer.

For collecting information about operation of the processor and for controlling the processor the chip 100 includes an "on-chip emulator" which comprises storage and processing circuitry for that purpose. Such an on-chip emulator 20 is shown schematically on FIG. 1 as having a control path 21 connected to the digital signal processor 10 and having an information-collecting path 22 from the digital signal processor 10.

Typically the on-chip emulator 20 has associated JTAG circuitry 30 connected to it, as known to those skilled in the art.

The chip further comprises a USB interface circuit 40. The USB interface 40 has a first port 41 connected to the on-chip emulator 20, a second port 42 connected on-chip to a USB port 50 via a universal serial bus 51. The USB interface circuitry also has a further port 42 connected to the JTAG circuitry 30 which in turn has an on-chip connection 31 to a JTAG port 60.

A universal serial bus is, in use, connected to the USB port 50. The universal serial bus 52 connects at its other end to a host device, typically a debugging computer having a USB port.

Debugging may take place using the host device; however by virtue of the USB connection, it may be possible to debug from a more remote location, as will be later described herein.

Figure 2:
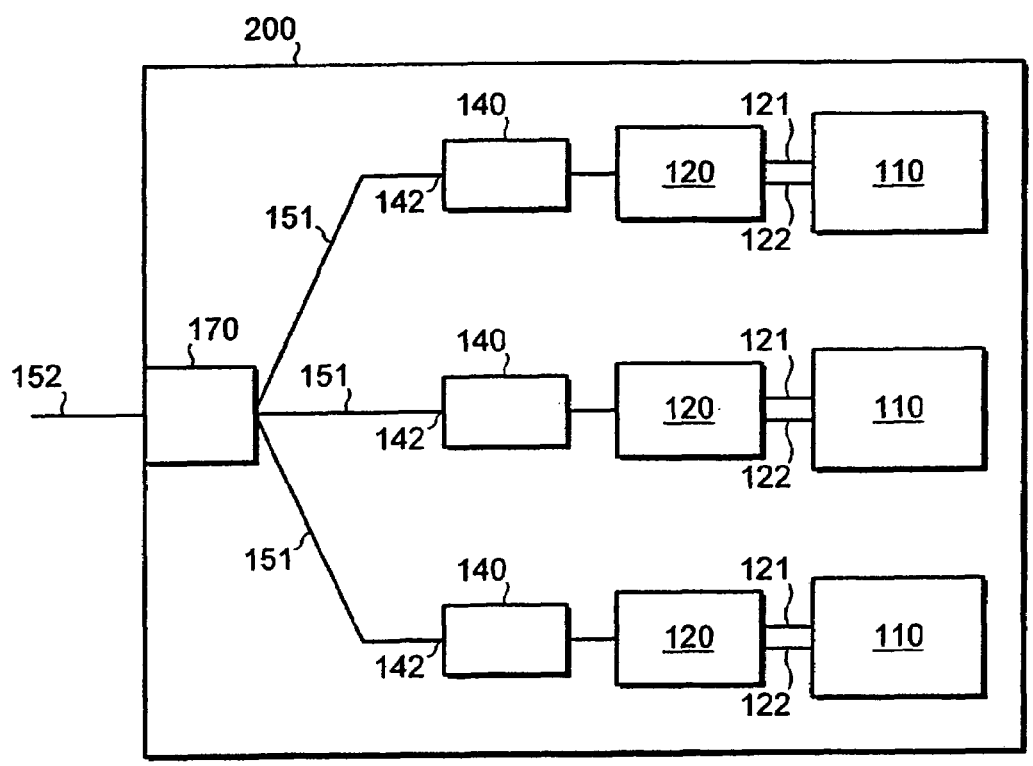
FIG. 2 shows a block schematic diagram of an integrated circuit chip incorporating an on-chip emulator, the chip having plural on-chip processors.

Referring now to FIG. 2, a second integrated circuit chip 200 comprises plural, here 3, embedded digital signal processors 110, each having a respective associated on-chip emulator 120 connected to it via a respective control path 121 and information collecting path 122. Each on-chip emulator 120 is connected to respective USB interface circuitry 140 and each USB interface circuitry 140 has a USB input port 142 to which is connected an on-chip universal serial bus 151 which connects to an on-chip USB hub 170. JTAG circuitry as shown in FIG. 1 may also be provided but is here emitted for the sake of clarity.

The USB hub 170 has an input for a universal serial bus 152, whereby debugging occurs.

The non-proprietary buses provide the ability to download programs and monitor and control the processor (so-called "peek" and "poke") in combination with a remote or host system. The bus also allows a general bi-directional communication path between the host and target system.

Moreover, by use of the on-chip emulator and the bus there is provided a mechanism through which any processor or peripheral on-chip can remotely access "virtual" devices by means of a proxy process on the host. As an example, a program running on a processor on a chip is able to execute a "socket call" which packages the parameters of the call into a packet. The packet is then sent back over the bus to the host or to an intermediate device which then unwraps the parameters and makes the real "socket call". Such a technique can be used for any software function call.

The use of the non-proprietary bus also enables a route for a host program to configure and control silicon components on a highly integrated device. It enables programming of any on-chip EEPROM and for production programming diagnostics.

During the debugging phase the non-proprietary bus enables coherent control and graphical representation and behaviour of systems on silicon with one or more processors.

Connection to the JTAG circuitry allows for JTAG functions to be executed through the USB port although it should be borne in mind that a JTAG port would still be needed to allow connection to other devices. It will be appreciated by those skilled in the art that whereas JTAG functions normally require a special adapter card this would not be the case using embodiments of the present invention.

Use of the non-proprietary bus allows the multiplexing together of the above-described functions using the bus. A hub would be needed on-chip to enable multiplexing at hardware level. Such a connection is advantageously realized using USB in the 12 Mb/s incarnation since this is in line with Ethernet.

In the state of the art, Ethernet chips are conventionally added at board level. Alternatively real-time hardware emulators are used which provide only limited functionality.

Using chips having USB ports the need for a hardware emulator in the host ceases. Typically, the host may implement a simple proxy server to manage a USB port on the host and which deals with the data from components and functions in the target device. When a program running on the host needs to communicate to a device or service within the target system, that host program communicates to the proxy server which in turn connects it to the required part of the target. Services include program load and debug, configuration, visualisation, EEPROM programming, running diagnostics, implementation of virtual devices that can be accessed from any CPU within a multiprocessor, or multi CPU systems on silicon device. The embodiment is also capable of Internet access by a simple remote procedure call which requires only a small memory resource on the target which is communicated from the target to the proxy server on the host to convert the remote procedure call into a real socket call. It is envisaged to use a "plug-and-play" set-up for the USB driver.

Figure 3:
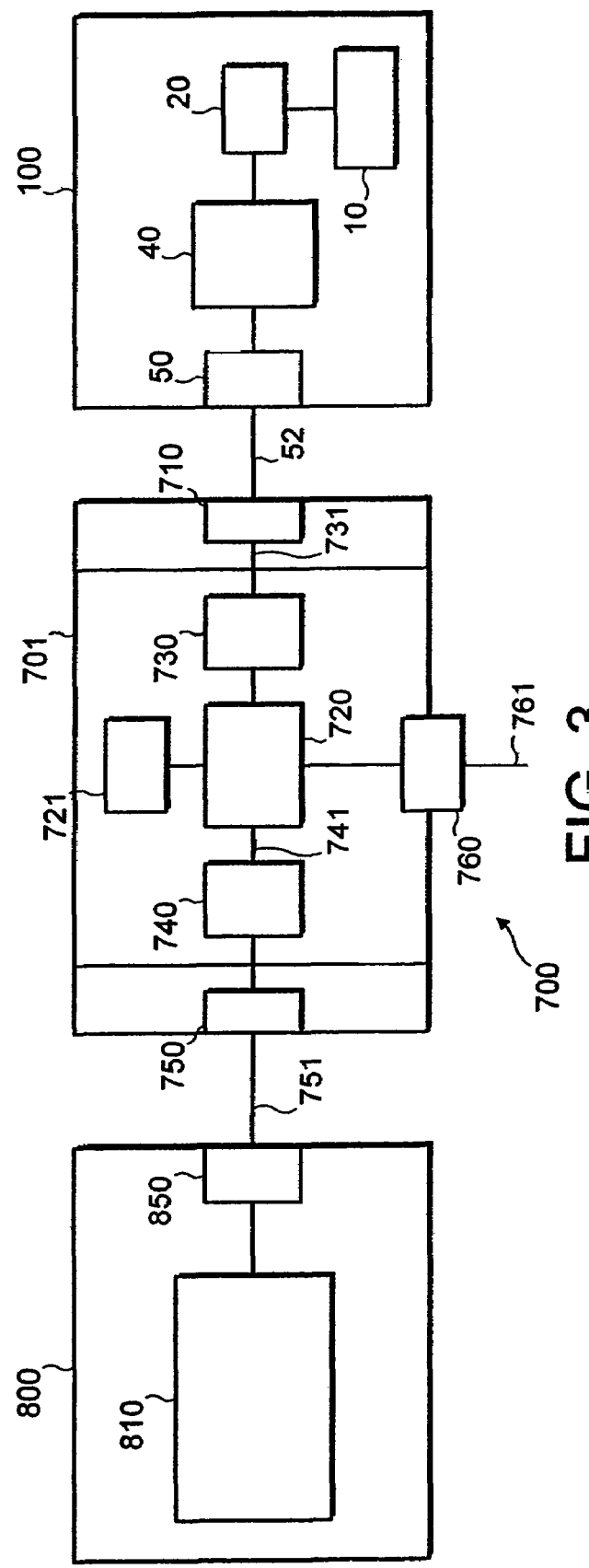
FIG. 3 shows an embodiment of the combination of the device of FIG. 1 with a communication device, in accordance with the present invention In the various figures, like reference numerals indicate like parts.

Referring to FIG. 3 an embodiment of the present invention will now be described.

A target chip 100, as described with respect to FIG. 1, is connected via a communication device 700 to a host computer system 800. The communication device 700 has an Ethernet port 750, a universal serial bus port 710 and an integrated circuit chip 701 having on-chip processing circuitry 720, on-chip memory circuitry 721, an on-chip Ethernet interface 740 and an on-chip universal serial bus interface 730. The on-chip Ethernet interface is connected to said Ethernet port via wiring 741, and the universal serial bus interface is connected to the universal serial bus port via wiring 731. The Ethernet port 750 connects to the host via a direct link 751. The on-chip memory circuitry 721 may comprise flash-memory.

Connections on chip link the interfaces to the processing circuitry so that data incoming on the link 751 are translated from the Ethernet protocol to the form chosen for the processing circuitry 720. Any data to be sent to the target device is output by the processing circuitry 720 to the universal serial bus interface and there translated to the universal serial bus protocol and transferred via the universal serial bus 52 to the target.

In use the on-chip processing circuitry 720 operates using embedded web server processes and the communication device forms an intelligent networked device. The consequence is that it is possible to move certain selected processes from the host onto the on-chip processing circuitry 720. Typically processes suitable for implementation on the on-chip processing circuitry include those that need frequent interaction with the target. Examples of these are filtering debug events, and executing large numbers of detailed configuration scripts. Other processes which could usefully be moved to the circuitry 720 are those which need time-critical interaction with the target where other conditions could prevent the host from such interactions.

Continued reference to FIG. 3 shows that the communication device 700 has a further port 760, this being for connection to a telephone line 761. To provide data of the right form for such signalling, the processing circuitry may form a soft modem or alternatively an on-chip hard modem may be provided, as known to those skilled in the art.

Use of the telephone line port enables Internet connection if so required, given the existence of suitable software in the communications device. Alternatively, users can connect their target systems for remote evaluation by, for example, the manufacturer. Yet another alternative is to provide the facility to upgrade or otherwise modify the contents of stored information in the target.

What is claimed is:

1. A communication device for a target integrated circuit chip having a digital processor, an on-chip emulator for controlling said digital processor and for collecting operation data from said digital processor for communicating to off-chip circuitry, and a target on-chip universal serial bus interface connected to said on-chip emulator, the communication device comprising:
    an Ethernet port,
    a universal serial bus port, and
    a further integrated circuit chip having on-chip processing circuitry, on-chip memory circuitry, an on-chip memory interface for connection to memory in said device but external to the further integrated circuit chip, an on-chip Ethernet interface, and an on-chip universal serial bus interface, said on-chip Ethernet interface being connected to said Ethernet port, the said on-chip Ethernet and universal serial bus interfaces being connected to said processing circuitry for translating between Ethernet protocol data on an Ethernet bus connected to said Ethernet port and universal serial bus data for said target on-chip universal serial bus interface.

2. A communication device for a target integrated circuit chip having a digital processor, an on-chip emulator for controlling said digital processor and for collecting operation data from said digital processor and for communicating to off-chip circuitry, and a target on-chip universal serial bus interface connected to said on-chip emulator, the communication device comprising:
    an Ethernet port,
    a universal serial bus port, and
    a further integrated circuit chip having on-chip processing circuitry, on-chip memory circuitry, modem circuitry for connection of a telephone line to a universal serial bus, an on-chip Ethernet interface and an on-chip universal serial bus interface, said on-chip Ethernet interface being connected to said Ethernet port, the said on-chip Ethernet and universal serial bus interfaces being connected to said processing circuitry for translating between Ethernet protocol data on an Ethernet bus connected to said Ethernet port and universal serial bus data for said target on-chip universal serial bus interface.

3. The device of claim 2, wherein said modem circuitry comprises a soft modem.

4. The device of claim 2, wherein said modem circuitry comprises a hard modem.

5. A combination of a communication device and a target integrated circuit chip, said target integrated circuit chip having a digital processor, an on-chip emulator for controlling said digital processor and for collecting operation data from said digital processor for communicating to off-chip circuitry, and a target on-chip universal serial bus interface connected to said on-chip emulator, the communication device comprising:
    an Ethernet port for connection to said off-chip circuitry,
    a universal serial bus port, and
    a further integrated circuit chip having on-chip processing circuitry, on-chip memory circuitry, an on-chip Ethernet interface and an on-chip universal serial bus interface, said on-chip Ethernet interface being connected to said Ethernet port, the said on-chip Ethernet and universal serial bus interfaces being connected to said processing circuitry for translating between Ethernet protocol data on an Ethernet bus connected to said Ethernet port and universal serial bus data for said target on-chip universal serial bus interface, wherein the on-chip emulator is connected to the communication device via a universal serial bus.

6. The combination of claim 5 further comprising modem circuitry for connection of a telephone line to said processing circuitry of said communication device.

7. A method of communicating with a target integrated circuit chip having a digital processor, an on-chip emulator for controlling said digital processor and for collecting operation data from said digital processor for communicating to off-chip circuitry, and a target on-chip universal serial bus interface connected to said on-chip emulator, the method comprising:

supplying data from said off-chip circuitry via an Ethernet bus to an Ethernet port of a communication device comprising a further integrated circuit chip having on-chip Ethernet interface circuitry and on-chip processing circuitry;

passing said data as an input said Ethernet interface circuitry; in said Ethernet interface circuitry, translating said data into a form suitable for said on-chip processing circuitry;

supplying said translated data to said on-chip processing circuitry;

processing said translated data to provide output data;

applying said output data to an on-chip universal serial bus interface, for transfer via a universal serial bus to said on-chip emulator of said target integrated circuit chip.

8. A method of debugging a target integrated circuit chip using a host computer device, said target integrated circuit having a digital processor and an on-chip emulator wherein said on-chip emulator is operable to control said digital processor according to a host program and to collect operation data from said digital processor for communicating to said host, said chip comprising a target on-chip universal serial bus interface connected to said on-chip emulator, the method comprising providing a communication device comprising an Ethernet port, a universal serial bus port and a further integrated circuit chip having on-chip processing circuitry, on-chip memory circuitry, an on-chip Ethernet interface and an on-chip universal serial bus interface, connecting said Ethernet port to said host via an Ethernet link;

connecting said communication device to said target on-chip universal serial bus interface and said on-chip emulator via a universal serial bus;

communicating data between said on-chip emulator and said on-chip processing circuitry;

processing data in said on-chip processing circuitry to provide output data; and supplying said output data to said host via said Ethernet port.

9. The method of claim 8 and further comprising loading a program from said host to said on-chip processing circuitry over said Ethernet link.

10. The method of claim 8 comprising running an embedded web-server process on said on-chip processing circuitry.

11. A method of debugging a target integrated circuit chip having a digital processor and an on-chip emulator wherein said on-chip emulator is operable to control said digital processor and to collect operation data from said digital processor for communicating to a host, said chip comprising a target on-chip universal serial bus interface connected to said on-chip emulator, the method comprising providing a communication device comprising an Ethernet port, a universal serial bus port and a further integrated circuit chip having on-chip processing circuitry, on-chip memory circuitry, an on-chip Ethernet interface and an on-chip universal serial bus interface, connecting said Ethernet port to said host;

connecting said communication device to said target on-chip universal serial bus interface and said on-chip emulator via, a universal serial bus;

communicating data between said on-chip emulator and said on-chip processing circuitry;

processing said data in said on-chip processing circuitry to provide output data;

supplying said output data to said on-chip emulator.

* * * * *